Patented Dec. 30, 1924.

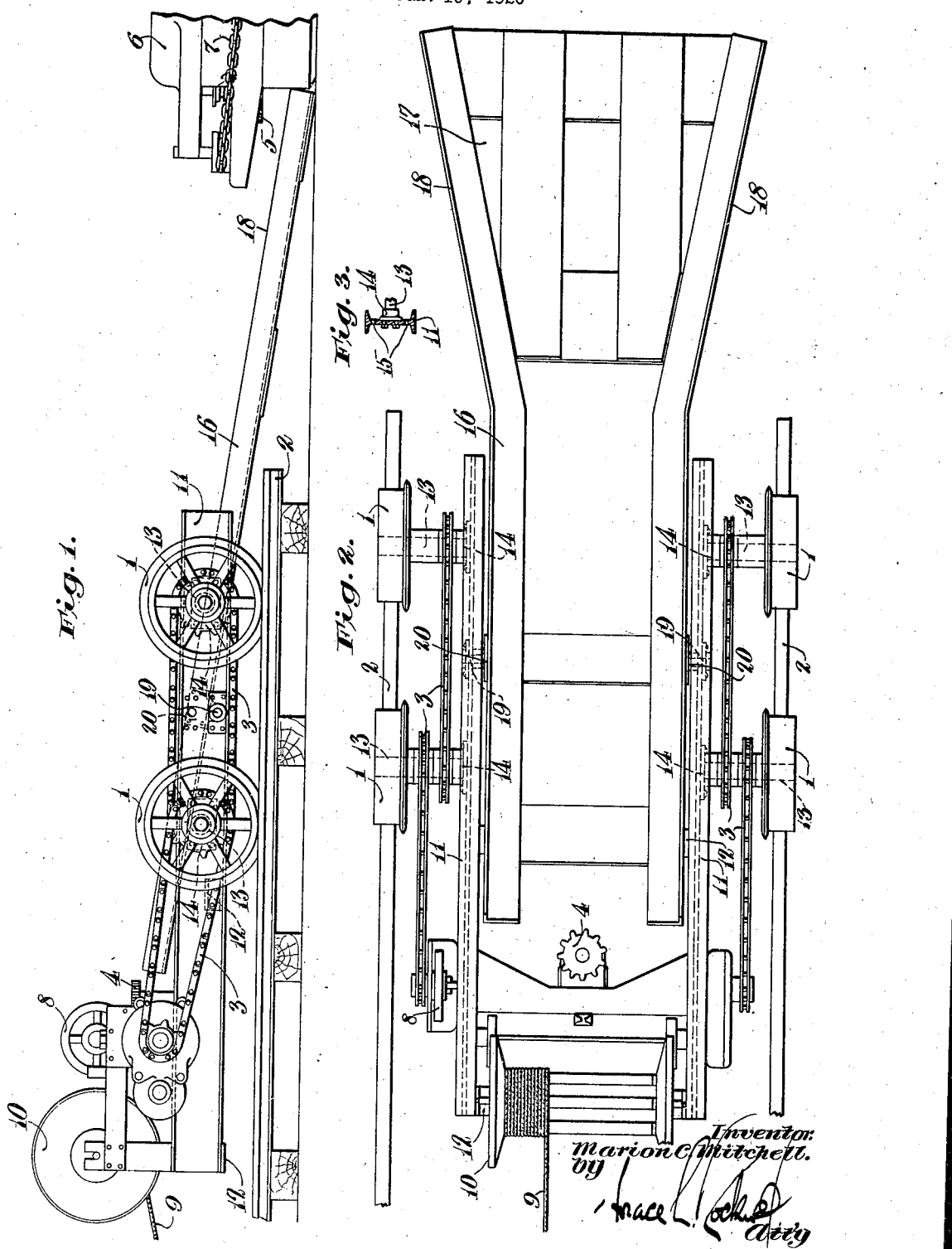

1,521,037

UNITED STATES PATENT OFFICE.

MARION C. MITCHELL, OF CHICAGO, ILLINOIS, ASSIGNOR TO SULLIVAN MACHINERY COMPANY, A CORPORATION OF MASSACHUSETTS.

TRUCK.

Application filed January 10, 1920. Serial No. 350,504.

*To all whom it may concern:*

Be it known that I, MARION C. MITCHELL, a citizen of the United States, residing at Chicago, in the county of Cook and State of Illinois, have invented certain new and useful Improvements in Trucks, of which the following is a full, clear, and exact specification.

My invention relates to trucks.

It has for its object to provde an improved truck, and one especially adapted to use with a mining machine in low vein work, whereby it is made possible to transport a mining machine under varying conditions and to unload or load the machine with facility without bringing the machine into engagement with the low lying roof. A further object of my invention is to provide an improved, simplified, and rugged truck which is adapted to enable a mining machine to be unloaded therefrom with great facility, and which at the same time is of such a simple and rugged construction as to enable it to be manufactured at small expense.

In the accompanying drawings, I have shown for purposes of illustration one embodiment which my invention may assume in practice.

In these drawings,—

Fig. 1 is a side elevation of this form of my improvement, the truck being shown in unloaded position with a mining machine just passing off of the same.

Fig. 2 is a plan view of the truck.

Fig. 3 is a detail partial sectional view of one of the adjustable axle boxes.

In this illustrative construction, I have shown a truck mounted upon usual wheels 1 and adapted to run over the mine track 2 and be driven through usual wheel driving connections 3 from a gear 4 carried on the truck, the gear 4 in turn being driven by a gear 5 on a mining machine 6 adapted to be transported on the truck and having a flexible feed member 7. As in a usual construction, the truck driving mechanism is also controlled by suitable controlling mechanism (not shown), including a controlling wheel 8 carried on the rear end of the truck, and the mining machine is also connected to a source of current through a conductor 9 wound on a suitable reel 10 likewise carried on the rear end of the truck.

In my improved construction, the truck frame per se is preferably formed of a plurality of laterally spaced, longitudinally disposed, rigid side members 11, if desired in the form of I-beams suitably tranversely connected at their rear ends, as at 12, in such a manner as to form a rigid construction. As shown, the axles 13 of the wheels 1 are also preferably in the form of stub axles carried by axle boxes 14, in turn suitably rigidly attached to and projecting laterally from the outer sides of these members 11 in such a manner as to leave a clear space between the latter at their front ends, the boxes also preferably being adjustable vertically in a series of holes 15 in the members 11, for a purpose hereinafter described. In the space between the front ends of the members 11 is disposed a load carrying element, herein a loading and unloading element and in the form of an open ended machine receiving and guiding element 16, preferably flared at its front end, as at 17, to permit the same to receive or discharge a machine at an angle, and having the usual guiding flanges 18 on its sides adapted to cooperate with the bottom of the member 16 in guiding a machine in its movement relative thereto. As shown this member 16 is in turn pivoted at its opposite sides and more closely adjacent its rear end, on a suitable horizontally disposed pivot, herein including pivot members 19, adjustable like the axle boxes 14 and carried on the adjacent sides of the members 11 and projecting inward therefrom, suitable cooperating journal boxes 20 preferably being fixed to the flanges 18 on the member 16. It will also be particularly noted that the pivot members 19 are located below the tops of the wheels 1 and herein beneath the plane of the wheel axes and between these axes, the construction being such that the bottom of the member 16, upon which rests the mining machine, is disposed beneath the plane of the axes of the wheels in such a manner as thereby materially to reduce the over-all height of the apparatus.

In the use of my improved construction, the mining machine 6 is transported from place to place on the truck, the mining machine then being disposed at the rear end of the member 16 with its gear 5 meshing with the gear 4 in such a manner as to enable the truck to be driven by the mining machine. In this position, it will be noted that the weight of the machine 6 acts to hold the member 16 in horizontal position with its rear end supported upon one of the connecting members 12, the latter preferably, as shown, being suitably raised to permit it to perform this additional function. When it is desired to remove the machine, as, for instance, when a place is reached, the machine is also unloaded in the usual manner, its flexible feed member 7 being then connected in the usual manner to the face and acting to draw the machine forward on the member 16 and automatically to tilt the latter into the inclined position shown in Fig. 1. In this position the member 16 will remain, until by a connection of the feed member 7 to an abutment on the truck, the machine in its return movement to the truck is pulled up the member 16 to loaded position, automatically tilting the latter member back into transport position as it moves.

As a result of my improvement, it will be observed that it is possible to produce a truck, especially adapted to low vein work, wherein the bottom of the machine is disposed materially beneath the top of the wheels and even beneath the axes of the wheels, thereby substantially reducing the over-all height of the truck and the machine. Further, by my improvement it is made possible to use wheels of large diameter, a feature of decided advantage on rough tracks, and do so without increasing the height of the apparatus, the vertically adjustable axle boxes being adjustable on the members 11 to accommodate wheels of varying size, and the pivots 19 and the support 12 for the rear end of the members 16, both likewise being adjustable when desired. It will also be evident that, due to the location of the pivots 19 during the tilting movements of the member 16, the rear end of that member will not be elevated sufficiently to cause the same or the machine to engage with a low roof. At the same time, it will be noted that through my improved construction it is possible to load or unload a mining machine with greater facility due to the fact that the pivots are located in the rear of the front wheels, thereby enabling a more gradual slope to be obtained. So far as the construction of the truck is concerned, attention is particularly directed to the fact that through my improved construction it is also possible to provide a truck of the most simple, rugged, and inexpensive character, thereby materially reducing the cost of manufacture and increasing the life of the truck. These and other advantages of my improved construction will, however, be clearly apparent to those skilled in the art.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In a mining truck, a truck frame including wheeled side members adapted to intersect all the wheel axes, and a load loading member supported on said members and movable therebetween.

2. In a mining truck, a truck frame including laterally wheeled side members disposed between their wheels and a load carrying member definitely pivoted on said members and movable therebetween.

3. In a mining truck, a truck frame including wheeled side members, and a load loading member movable between the same about a fixed horizontal pivot on said side members.

4. In a mining truck, a truck frame including wheeled side members, and a load carrying member being only pivoted thereon on a horizontal pivot disposed beneath the wheel axes.

5. In a mining truck, a truck frame including wheeled side members, a loading and load carrying member pivoted on said members on a horizontal pivot and means whereby said pivot may be disposed above or below the wheel axles.

6. In a truck, a truck frame including wheeled side members, a load carrying member pivoted on said members, and means whereby its pivot may be adjusted vertically.

7. In a mining truck, a truck frame including wheeled side members which have their vertically spaced horizontal surfaces lying within the outer limits of all the wheels therefor, and a load loading member pivoted on said side members on a horizontal pivot disposed in rear of the front wheels.

8. In a truck, a truck frame comprising wheeled side members, and a loading and load carrying member pivoted thereon on a fixed horizontal pivot disposed between the wheel axes.

9. In a truck, a truck frame comprising wheeled side members, and a pivoted load carrying member thereon, said member being adapted to be disposed above and below certain of the wheel axes on opposite sides of its pivot.

10. In a truck, a truck frame comprising wheeled side members, and a load carrying member pivoted on said members on a vertically adjustable pivot betwen the wheel axes.

11. In a mining truck adapted to carry elongated mining apparatus, a rigid wheeled frame including side members connected only adjacent their rear ends and each carrying a wheel axis adjacent its front end, and a pivoted loading member movable between the front ends of said members, said pivot being so located that when said apparatus is properly loaded on said loading member the latter will automatically swing to its transporting position.

12. In a mining truck, a frame including members rigidly connected at their rear ends and having forward and rearward wheels, means for positively driving both of said wheels, and a vertically tiltable load carrying member carried by said members and vertically movable between the front ends thereof.

13. In a mining truck, a frame including wheeled side members rigidly connected at their rear ends and each carrying a plurality of wheels, means for positively driving at least all the wheels carried by one of said members, and a load carrying member supportable on said side members in a horizontal position and vertically movable between the front ends thereof.

14. In a mining truck, a frame including wheeled side members rigidly connected at their rear ends, and a load carrying member supportable on said side members in a horizontal position and movable on a pivot between the wheels thereof in a vertical direction between the front ends thereof, said side and carrying members lying in a relatively narrow vertical zone.

15. In a mining truck adapted to carry elongated mining apparatus, parallel side members rigidly connected and having an open end between the same, a load carrying member pivoted thereon between the same, said pivot being so located that when said apparatus is properly loaded on said loading member the latter will automatically swing to its transporting position, and supporting wheels on opposite sides of said pivot.

16. In a truck, parallel side members rigidly connected and having an open end between the same, a load carrying member pivoted thereon between the same, stub axles on opposite sides of said pivot, and wheels on said axles.

17. In a truck, a truck frame comprising parallel side members rigidly connected at their rear ends, a tiltable loading and load carrying member pivoted on a horizontal pivot thereon, and wheels vertically adjustable on said side members.

18. In a mining truck, a truck frame comprising parallel side members rigidly connected at their rear ends, a tiltable load carrying member pivoted on a horizontal pivot thereon, stub axles carried on the outer sides of said side members, and a plurality of wheels, certain of which are mounted on said stub axles and the remainder being longitudinally spaced from said stub axles, said pivoted member being adapted to be disposed above and below the axes of certain of said wheels.

19. In a truck, a truck frame comprising parallel side members rigidly connected at their rear ends, a tiltable load carrying member pivoted on a horizontal pivot thereon, and wheel carrying stub axles carried on the outer sides of each of said side members at points in front and rear of the pivot of said load carrying member.

20. In a mining truck adapted to carry elongated mining apparatus, a frame member including longitudinally disposed wheeled side members rigidly connected at their rear ends, a tiltable load carrying member pivoted between said side members and movable in a vertical direction across the axis of the front wheels, said carrying member being adapted to automatically assume its transporting position when said elongated apparatus is properly positioned thereon, and wheel driving mechanism carried at the rear end of one of said members and operable only when said apparatus assumes its proper transporting position.

21. In a mining truck adapted to carry mining apparatus, a frame including longitudinally disposed wheeled side members rigidly connected at their rear ends, a tiltable load carrying member pivoted between said members on a transverse pivot between the wheel axes and movable in a vertical direction, and wheel driving mechanism carried at the rear end of said frame and operable only when said apparatus assumes its transporting position.

22. A mining truck frame comprising rigid longitudinally extending side members and means for rigidly connecting the same, a load carrying member supported by said side members, and forward and rearward wheel carrying axles carried on said side members above the bottom of said load carrying member.

23. A mining truck frame comprising rigid longitudinally extending side members and means for rigidly connecting the same, a load carrying member supported by said side members, wheel carrying stub axles carried on said side members, and a plurality of wheels certain of which are mounted on said stub axles while the remainder have operative connection with said side members, the axes of all of said wheels being disposed above the bottom of said load carrying member.

24. A truck frame comprising rigid, vertically disposed, longitudinally extending side members and means for rigidly connecting the same, a load carrying member supported by said side members, wheel carrying axles carried on said side members above the bottom of said load carrying member, and means for vertically adjusting said axles.

25. In a mining truck adapted to carry elongated mining apparatus, a frame comprising wheeled side members rigidly connected at their rear ends, a tiltable loading and load carrying member movable therebetween and pivoted thereon in rear of the front wheels thereof, said tiltable member being automatically moved to its transporting position when said apparatus assumes its proper loaded position, and means carried by said side members for supporting said loading and load carrying member in horizontal position when at least a portion of said apparatus is on the rear end thereof.

26. In a truck, a frame including longitudinally extending, laterally spaced, wheeled side members rigidly connected at their rear ends, a machine receiving and guiding member pivoted on said members on a horizontal pivot and movable therebetween across the axis of the front wheels, wheel driving mechanism on said frame, and a mining machine carried on said machine receiving member and operatively connected to said mechanism.

In testimony whereof I affix my signature.

MARION C. MITCHELL.